United States Patent [19]
Baker, III

[11] Patent Number: 6,014,344
[45] Date of Patent: Jan. 11, 2000

[54] METHOD FOR ENHANCING SEISMIC DATA

[75] Inventor: Robert Allison Baker, III, Stafford, Tex.

[73] Assignee: Exxon Production Research Company, Houston, Tex.

[21] Appl. No.: 09/023,594

[22] Filed: Feb. 13, 1998

[51] Int. Cl.$^7$ .................................................. G01V 1/34
[52] U.S. Cl. .................. 367/48; 367/38; 367/70
[58] Field of Search ................... 367/30, 34, 48, 367/51, 70, 38, 73; 364/421

[56] References Cited

U.S. PATENT DOCUMENTS

| | | | |
|---|---|---|---|
| 4,679,174 | 7/1987 | Gelfand | 367/73 |
| 4,945,519 | 7/1990 | Stanley et al. | 367/48 |
| 4,992,995 | 2/1991 | Favret | 367/43 |
| 5,073,875 | 12/1991 | Kelly et al. | 367/38 |

OTHER PUBLICATIONS

Sheriff, R. E. and Geldart, L. P., *Exploration Seismology*, vol. 1: History, theory, & data acquisition and vol. 2: *Data–processing and interpretation*, sections 4.3.4, 8.1.4, and 10.6.6d, Cambridge University Press, 1982.

Schoenberger, M., Resolution Comparison of Minimum–Phase and Zero–Phase Signals, Geophysics, vol. 39, No. 6, pp. 826–833 (Dec. 1974).

*Primary Examiner*—Christine K. Oda
*Assistant Examiner*—Anthony Jolly
*Attorney, Agent, or Firm*—Keith A. Bell

[57] ABSTRACT

A method for enhancing zero-phase seismic data traces so that subtle geologic features are easier to identify and interpret. In a first embodiment, the method comprises enhancing the amplitudes of at least the peaks and troughs in the zero-phase seismic data traces. This enhancement can be accomplished in a variety of ways. In a second embodiment, the negative second difference is calculated at each sample point along the zero-phase seismic data trace to enhance bends or kinks in the data, as well as peaks and troughs.

13 Claims, 5 Drawing Sheets

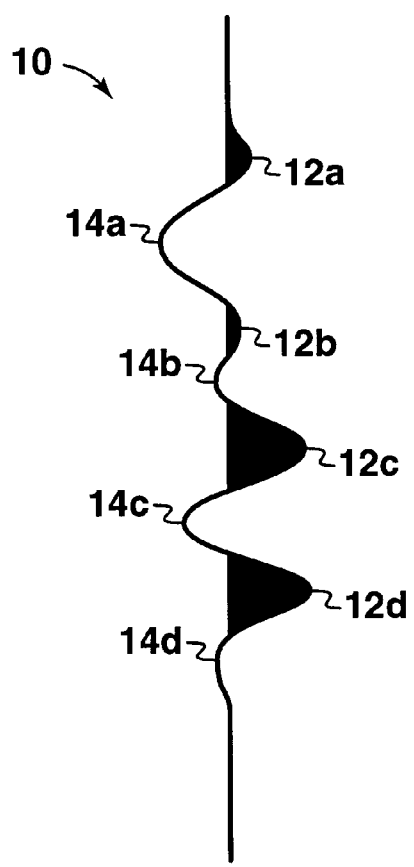
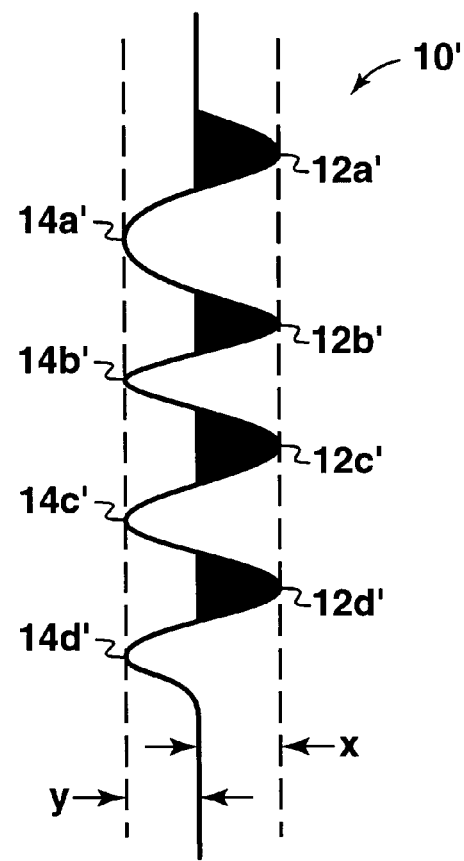
FIG. 1A  FIG. 1B

METHOD FOR ENHANCING SEISMIC DATA

FIELD OF THE INVENTION

This invention relates generally to the field of seismic prospecting and, more particularly, to seismic data processing and interpretation. Specifically, the invention is a method for enhancing seismic data so that subtle geologic features are easier to identify and interpret.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace." During the data processing stage, the raw seismic data traces are refined and enhanced so as to facilitate the data interpretation stage. For example, one common method for enhancing seismic data traces is through the common-midpoint (CMP) stacking process. As will be well known to persons skilled in the art, the "midpoint" for a seismic data trace is the point midway between the source location and the receiver location for that trace. According to the CMP method, the recorded seismic data traces are sorted into common-midpoint gathers each of which contains a number of different seismic data traces having the same midpoint but different source-to-receiver offset distances. The seismic data traces within each CMP gather are corrected for statics (i.e., the effects of variations in elevation, weathered layer thickness and/or velocity, and reference datum) and normal moveout (i.e., the variation of traveltime with respect to source-to-receiver offset) and are then summed or "stacked" to yield a stacked data trace which is a composite of the individual seismic data traces in the CMP gather. Typically, the stacked data trace has a significantly improved signal-to-noise ratio compared to that of the unstacked seismic data traces in the CMP gather.

Stacked data traces for a series of CMP locations falling along a particular survey line may be displayed side-by-side to form a stacked seismic section which simulates a zero-offset seismic section (i.e., a seismic section where every trace is the result of a coincident source and receiver). Thus, a stacked seismic section is a representation, in two-way seismic signal traveltime, of a vertical cross-section of the earth below the survey line in question. Stacked seismic sections are used in the data interpretation stage to predict subsurface stratigraphy.

Typically, the phase characteristics of seismic data traces recorded during the data acquisition stage are "minimum-phase," or nearly so. In other words, at the instant that a seismic signal reaches a subsurface reflector, a reflected signal begins to form. As the downgoing seismic signal rises in strength, the upgoing reflected signal also rises in strength. Similarly, as the downgoing seismic signal begins to decline in strength, the upgoing reflected signal also begins to decline. The result of this process is that in a conventional stacked seismic section, each subsurface reflector is marked by the leading edge of a seismic pulse or "wavelet."

Because a seismic data trace represents a convolution of many overlapping reflections, it is often difficult to clearly identify the leading edge of a seismic wavelet. It would facilitate interpretation of seismic data if the subsurface reflectors were marked by peaks or troughs in the data rather than by a rising or falling edge of a seismic wavelet because peaks and troughs are easier to identify. A procedure known as "zero-phase processing" is commonly used in the industry to accomplish this result. In zero-phase processing, the minimum-phase seismic wavelet embedded in the seismic data is converted to a zero-phase wavelet. Zero-phase wavelets are symmetrical, and the time scale is shifted so that the center of the wavelet indicates the arrival time. In other words, the center of a zero-phase wavelet coincides with the subsurface seismic reflector that caused the reflection. The conversion to zero-phase is preferably performed on the individual seismic data traces within a CMP gather prior to stacking; however, the conversion may also be performed after stacking has occurred. See, e.g., Sheriff, R. E. and Geldart, L. P., *Exploration Seismology*, Volume 1: *History, theory, & data acquisition* and Volume 2: *Data-processing and interpretation*, sections 4.3.4, 8.1.4, and 10.6.6d, Cambridge University Press, 1982. The result of this process is a zero-phase seismic section in which the subsurface reflectors generally are marked by peaks and/or troughs in the stacked data traces.

Another advantage of zero-phase processing is that the resulting zero-phase seismic data traces typically have better seismic resolution (i.e., the ability to distinguish two reflectors which are close together) than the seismic data traces recorded during the data acquisition stage. See Schoenberger, M., "Resolution comparison of minimum-phase and zero-phase signals," *Geophysics*, Vol. 39, No. 6, pp. 826–833, December 1974. Accordingly, converting the recorded seismic data traces to zero-phase data traces permits identification and interpretation of shorter geologic intervals than is possible with conventional seismic data processing.

For the reasons set forth above, zero-phase processing results in a zero-phase seismic section that is easier to interpret than a routine stacked seismic section. However, zero-phase processing does not resolve all seismic data interpretation problems. For example, although zero-phase seismic data has better seismic resolution than conventional seismic data, seismic resolution may still be a problem for thin geologic features. Many subsurface geologic features of interest to the petroleum industry are from about five to about 50 feet in thickness. The cycle of a seismic pulse is typically sinusoidal and from about 80 to about 800 feet in length. Because a cycle consists of both a positive phase and a negative phase, the approximate resolution of a typical seismic pulse is from about 40 to about 400 feet. A seismic reflection is generated each time the seismic pulse encounters an impedance boundary. When the impedance boundaries are closer together than the resolution of the seismic pulse, the seismic reflections overlap, as noted above. Thus, the presence of an impedance boundary of interest may appear as only a small anomaly on the sinusoidal seismic data trace, such as a subdued peak or a departure from sinusoidal (i.e., a bend or kink in the data). Failure to identify and interpret these anomalies can result in erroneous conclusions regarding the subsurface stratigraphy.

Thus, there is a need for a method for enhancing seismic data to make subtle geologic features more easily identifiable. Such a method should permit the identification and interpretation of geological features marked only by an anomaly in the zero-phase data. The present invention satisfies this need.

SUMMARY OF THE INVENTION

In one embodiment, the present invention is a method for enhancing a seismic data trace comprising the steps of (i) transforming the seismic data trace to a zero-phase seismic data trace; (ii) locating all peaks and troughs on at least a portion of the zero-phase seismic data trace; and (iii) enhancing the amplitude values of the peaks and troughs. This enhancement can be accomplished in a variety of ways. For example, the amplitudes of all peaks may be adjusted to equal a first arbitrarily selected constant amplitude, and the amplitudes of all troughs may be adjusted to equal a second arbitrarily selected constant, which may be equal to or different from the first constant. Alternatively, the amplitudes of all peaks may be made equal to the largest peak amplitude on the data trace, and the amplitudes of all troughs may be made equal to the largest trough amplitude on the data trace. In another alternative, minimum amplitudes are specified for the peaks and troughs, and all peaks and troughs having amplitudes less than the specified minimum are enhanced to the specified minimum values.

In another embodiment of the invention, the zero-phase seismic data traces are converted to curvature traces. The curvature traces may be generated by taking the second derivative with respect to time of the zero-phase data traces, provided that the data traces have been converted to continuous interpolated data traces defined at every time point. Alternatively, and perhaps preferably, the curvature traces can be approximated by calculating the negative second difference of the discretized digital data at each sample point and plotting the result.

BRIEF DESCRIPTION OF THE DRAWINGS

The present invention and its advantages will be better understood by referring to the following detailed description and the attached drawings in which:

FIG. 1A illustrates a hypothetical zero-phase seismic data trace, and FIG. 1B illustrates the same seismic data trace after application of a first embodiment of the present invention;

Figure 2:
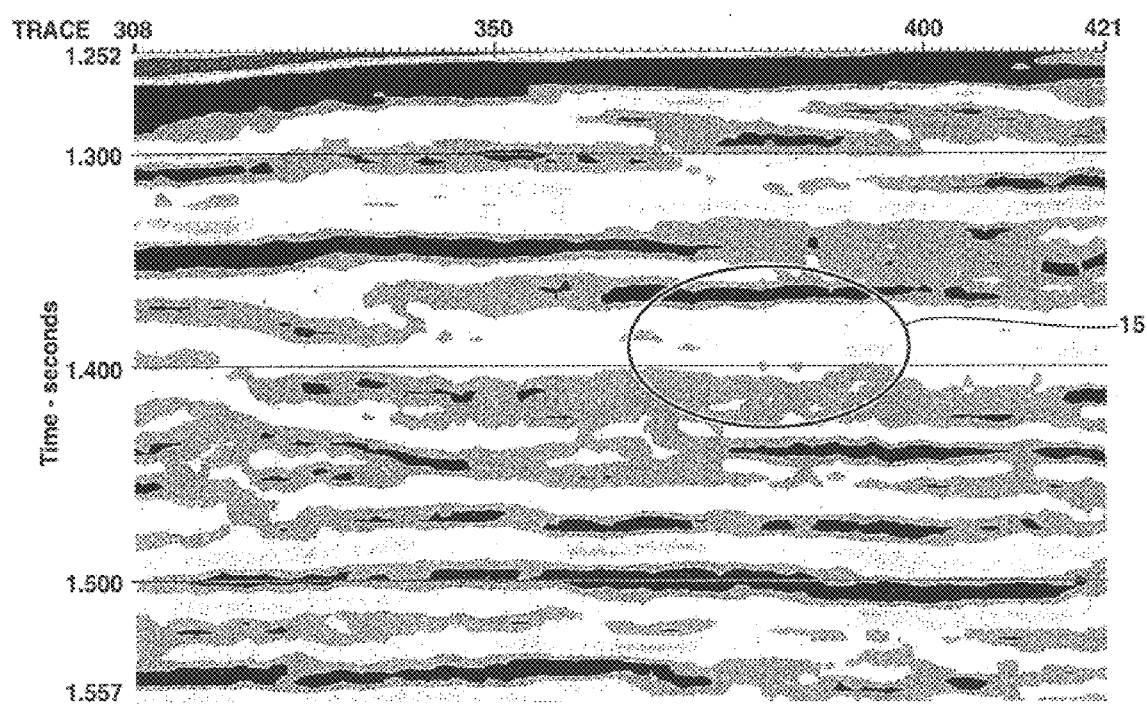
FIG. 2 is a zero-phase seismic section for a particular survey line.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention is a method for enhancing zero-phase seismic data to make subtle geologic features easier to identify and interpret. Preferably, the inventive method is applied to the individual zero-phase stacked seismic data traces of a zero-phase seismic section. However, the method may also be used to enhance zero-phase seismic data traces prior to stacking.

As will be readily apparent to persons skilled in the art, the method of the present invention is preferably implemented using a suitably programmed digital computer. Persons skilled in the art could easily develop computer software for practicing the inventive method based on the teachings set forth herein.

The following detailed description will be based on implementation of the invention in the time domain. However, persons skilled in the art will understand that the invention may also be implemented in other data domains, such as the frequency domain, without departing from the true spirit and scope of the invention.

In a first embodiment, the invention comprises directly enhancing the amplitudes of the peaks and troughs on the zero-phase data traces so that the peaks and troughs are easier to identify. As noted above, this enhancement may be applied to either prestack or poststack zero-phase data traces.

This embodiment of the invention is illustrated in FIGS. 1A and 1B. FIG. 1A illustrates a hypothetical zero-phase seismic data trace 10 (either prestack or poststack) having four peaks 12a–12d and four troughs 14a–14d. The amplitudes of peaks 12a and 12b are quite small compared to those of peaks 12c and 12d. Similarly, the amplitudes of troughs 14b and 14d are small compared to those of troughs 14a and 14c. FIG. 1B illustrates the same data trace 10' after application of the present invention. The amplitude of each of the peaks 12a'–12d' has been adjusted to equal a constant value x, and the amplitude of each of the troughs 14a'–14d' has been adjusted to equal a constant value y, which may or may not be equal to x. Thus, peaks and troughs in the hypothetical trace 10 (FIG. 1A) having small amplitudes have been enhanced to permit easy identification.

In an alternate embodiment (not illustrated), the value of x is equal to the maximum peak amplitude of the unenhanced peaks 12a–12d (FIG. 1A) and the value of y is equal to the maximum trough amplitude of the unenhanced troughs 14a–14d (FIG. 1A). In other words, the amplitude of peaks 12a, 12b, and 12c would be enhanced to be equal to the amplitude of peak 12d, and the amplitude of troughs 14b, 14c, and 14d would be enhanced to be equal to the amplitude of trough 14a. In another alternate embodiment (not illustrated), minimum amplitude values for the peaks and troughs are specified, and all peaks and troughs having amplitudes less than the specified minimums are identified and enhanced to the specified minimum values.

Other methods for enhancing the amplitude values of the peaks and troughs will be apparent to persons skilled in the art. For example, the enhancement could be based on the local phase of the zero-phase data trace. The concept of local phase is reached by comparing the trace to the cosine function, i.e., local phase is zero at peaks, π at troughs, and π/2 or 3π/2 at inflection points. The cosine of local phase is 1 at peaks, −1 at troughs, and 0 at inflection points. Thus, each peak on the zero-phase data trace would be assigned an amplitude valve of 1 in the enhanced trace, each trough would be assigned any amplitude value of −1, and each inflection point would be assigned an amplitude value of 0.

Figure 3:
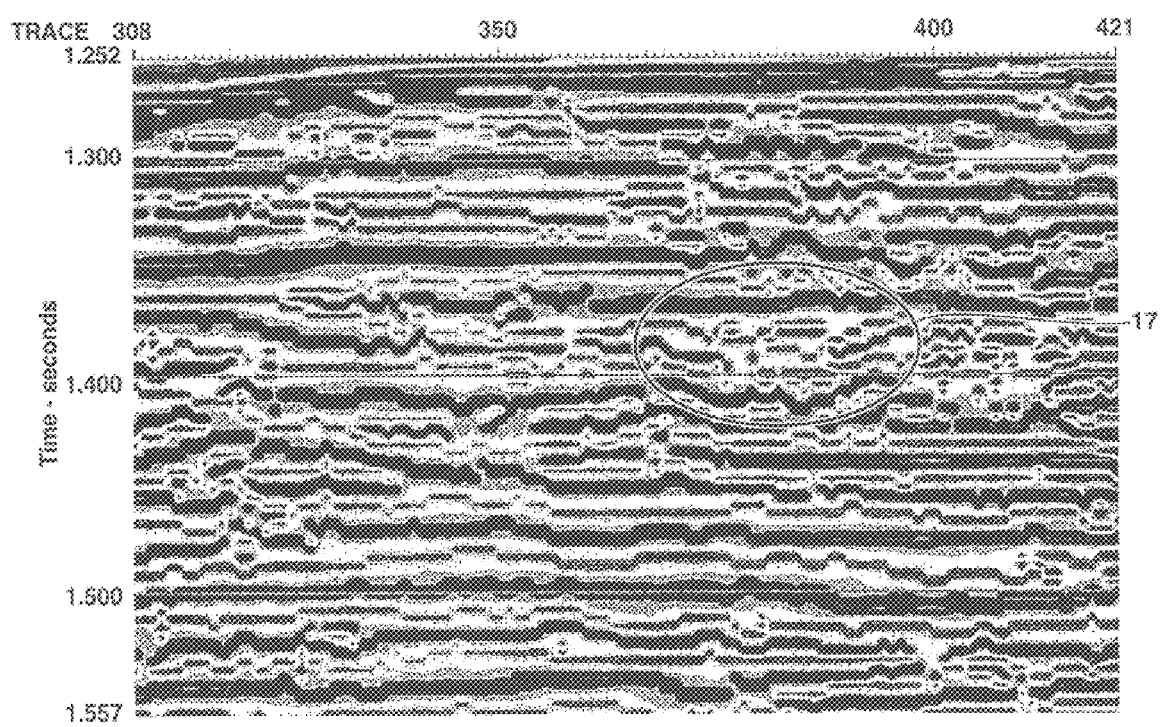
FIG. 3 is the same seismic section as shown in FIG. 2 after enhancement of the peaks and troughs according to the present invention.

FIGS. 2 and 3 illustrate application of the invention to an actual data set. FIG. 2 is a zero-phase seismic section for a particular survey line prior to enhancement. FIG. 3 shows the same zero-phase seismic section after enhancement of the peaks and troughs in the manner described above with respect to FIGS. 1A and 1B. FIG. 3 shows the remnants of an ancient stream channel (reference numeral 17) that is not visible in FIG. 2 (reference number 15).

In another embodiment of the invention, the zero-phase data traces (either prestack of poststack) are enhanced by converting them to "curvature" traces. These curvature traces are then used to construct "curvature" sections for use in the data interpretation process.

As used herein, "curvature" is a measure of the concavity or convexity of an arc; i.e., it is the inverse of the radius of curvature of the arc (i.e., the radius of an inscribed circle). Sharp turns have larger curvatures than blunt turns because a circle inscribed in a sharp turn will have a smaller radius (and, therefore, a larger curvature) than a circle inscribed in a blunt turn.

With respect to a seismic data trace, curvature is a measure of the rate of bending in the trace as a function of two-way seismic signal traveltime. Curvature may be used to enhance peaks and troughs in zero-phase seismic data, and sometimes kinks or bends as well. Curvature also has a sign. Where a trace is a concave left, curvature is positive, regardless of whether the concavity is located on the positive or negative side of zero amplitude. Hence, even relative peaks located on the negative side of zero amplitude show up as positive peaks on a curvature trace.

Mathematically, for a continuous function in the time domain, curvature is defined by the second derivative with respect to time of the function. However, as will be well known to persons skilled in the art, digital seismic data actually comprises a series of discrete samples (typically at 4 millisecond intervals) of the amplitude of the seismic reflection. Computing a true second derivative for such discretized data requires spline-fitting or some other approximation to obtain a continuous interpolated trace defined at every time point. Methods for creating such an interpolated trace are well known to persons skilled in the art. Care should be exercised in creating the interpolated trace to avoid potential aliasing problems. The second derivative with respect to time of the interpolated trace is then computed to obtain a curvature trace.

For discretized seismic data, trace curvature may be approximated by the negative second difference ($-\Delta^2$) of the data, which is actually a measure of numeric acceleration. If $a_1$, $a_2$, and $a_3$ are successive sample amplitudes on a seismic trace, then the negative second difference at sample $a_2$ is defined by the following equation:

$$-\Delta^2 = -(a_3 + a_1 - 2a_2)$$

The "negative" second difference is used in order to compensate for a 180° phase rotation (polarity reversal) resulting from the second difference calculation.

Figure 4:
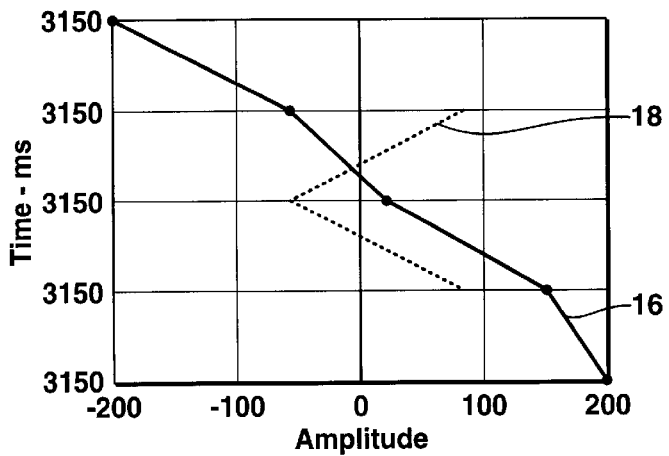
FIG. 4 illustrates the negative second difference concept.

Negative second difference may be used to enhance subtle features (e.g., bends or kinks) in the data, as well as peaks and troughs, so that their true continuity can be identified. FIG. 4 shows five data samples of a seismic data trace 16. TABLE 1 below gives the time and amplitude values for each of the five data samples, as well as the negative second difference (calculated according to the above formula) for the middle three data samples.

TABLE 1

| TIME (MS) | AMPLITUDE | $-\Delta^2$ |
|---|---|---|
| 3146 | −200 | — |
| 3148 | −50 | 80 |
| 3150 | 20 | −60 |
| 3152 | 150 | 80 |
| 3154 | 200 | — |

The negative second difference 18 is also plotted on FIG. 4.

It can be seen from FIG. 4 that negative second difference can be used to highlight subtle features of seismic character, as well as peaks and troughs. The bend in trace 16 at 3150 milliseconds may be a muted expression of an impedance boundary. It may also be noise. The negative second difference calculation can be used to enhance this feature so that it can be identified and traced laterally through the curvature section, but its meaning requires careful interpretation.

Figure 5:
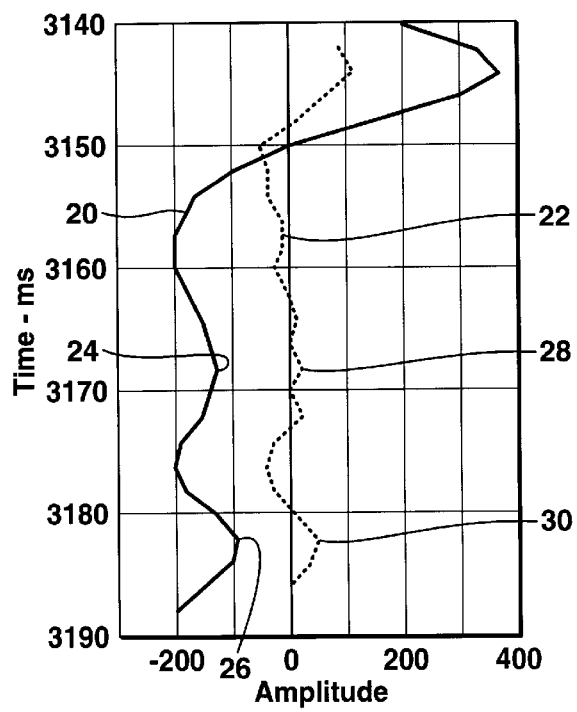
FIG. 5 illustrates a zero-phase seismic data trace and its corresponding curvature trace.
Figure 6:
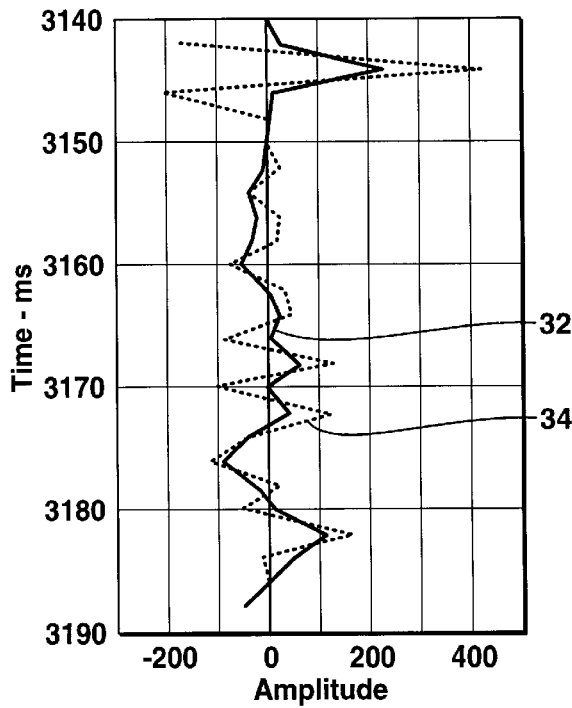
FIG. 6 illustrates another zero-phase seismic data trace and its corresponding curvature trace.

FIGS. 5 and 6 illustrate the results of the negative second difference calculation for two longer trace segments. FIG. 5 shows seismic data trace 20 and its related curvature trace 22. Trace 20 contains a number of relative peaks (e.g., relative peaks 24 and 26) located on the negative side of zero amplitude. On curvature trace 22, the corresponding peaks 28 and 30 are located on the positive side of zero amplitude. FIG. 6 shows seismic data trace 32 and its corresponding curvature trace 34. It can be seen that the peaks and troughs of the two traces generally track each other, with the curvature trace being more sensitive.

Figure 7A:
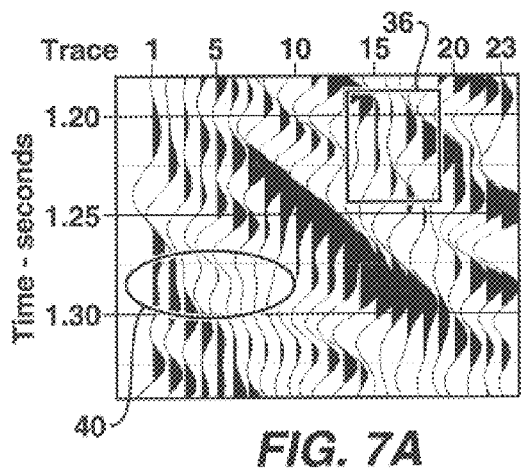
FIGS. 7A and 7B illustrate a series of zero-phase stacked data traces for a particular survey line and the corresponding curvature traces.
Figure 7B:
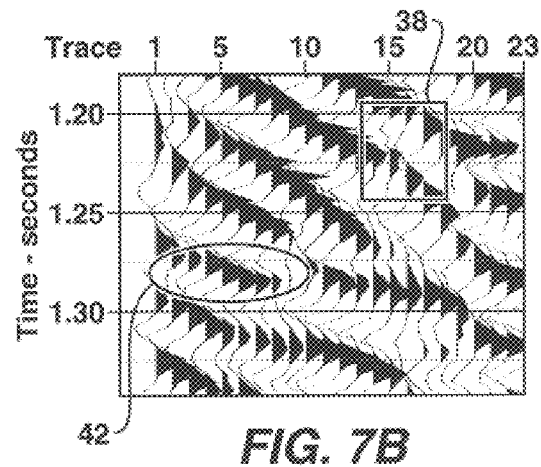
Figure 8A:
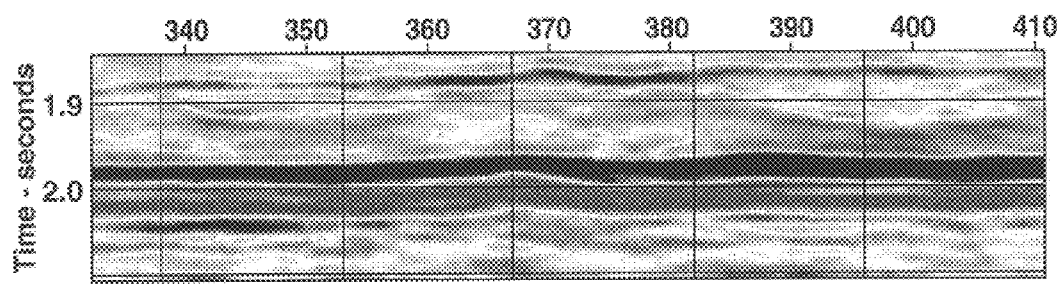
FIGS. 8A and 8B illustrate a zero-phase stacked seismic section and its corresponding curvature section.
Figure 8B:
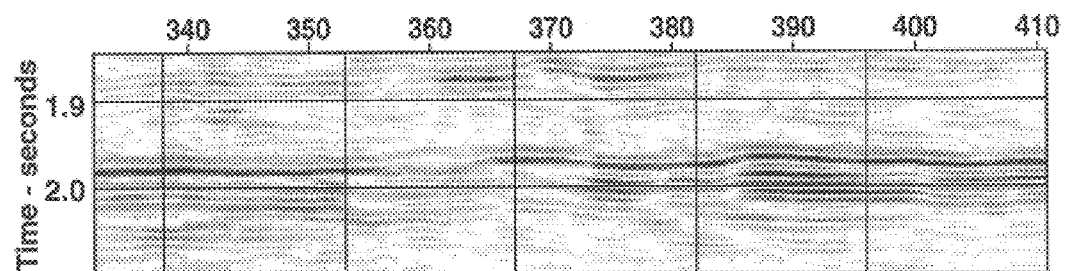

FIGS. 7A, 7B, 8A, and 8B further illustrate the utility of curvature traces. FIG. 7A shows 23 zero-phase stacked data traces for a particular survey line, and FIG. 7B shows the corresponding curvature traces. In FIG. 7A, box 36 shows a peak event that seems to split. However, in box 38 of FIG. 7B, it can be clearly seen that there are actually two separate events. Also, in FIG. 7A, the peaks within area 40 are difficult to follow, while the same peaks on the corresponding curvature traces (area 42 of FIG. 7B) are quite easy to identify and follow laterally. FIG. 8A is the conventional stacked seismic section, and FIG. 8B is the corresponding curvature section. Sequence boundaries and other geologically significant features are much easier to identify and interpret in the curvature section. The ability to identify such features is critical to sequence stratigraphy. Changing the gain and making other changes in the conventional stacked seismic section did not bring these features forward. Only the curvature section permitted them to be identified and interpreted.

The foregoing description is directed to particular embodiments of the present invention for the purpose of illustrating the invention. It will be apparent, however, to one skilled in the art that many modifications and variations to the embodiments described herein are possible. For example, a curvature trace may be generated by transforming the zero-phase data trace to the frequency domain to obtain an amplitude spectrum (i.e. a plot of amplitude versus frequency), multiplying each point on the amplitude spectrum by the associated frequency squared ($\omega^2$), and then inverse transforming the result back to the time domain. Implementation of the invention in other data domains may also be possible. All such modifications and variations are intended to be within the scope of the present invention, as defined by the appended claims.

I claim:

1. A method for enhancing a seismic data trace, said method comprising the steps of:

transforming said seismic data trace to a zero-phase seismic data trace;

locating all peaks and troughs on at least a portion of said zero-phase seismic data trace; and enhancing the amplitude values of said peaks and troughs.

2. The method of claim 1, wherein said step of enhancing the amplitude values of said peaks and troughs further comprises the steps of:

assigning a first constant amplitude value to each of said peaks; and assigning a second constant amplitude value to each of said troughs.

3. The method of claim 2, wherein said first constant is equal to said second constant.

4. The method claim 2, wherein said first constant is different from said second constant.

5. The method of claim 1, wherein said step of enhancing the amplitude values of said peaks and troughs further comprises the steps of:

determining a maximum peak amplitude value for all of the peaks on said portion of said zero-phase seismic data trace and assigning said maximum peak amplitude value to each of said peaks; and determining a maximum trough amplitude value for all of the troughs on said portion of said zero-phase seismic data trace and assigning said maximum trough amplitude value to each of said troughs.

6. The method of claim 1, wherein said step of enhancing the amplitude values of said peaks and troughs further comprises the step of assigning to each of said peaks and troughs an amplitude value calculated according to the following equation:

$A = a_1 + a_3 - 2a_2$ where "A" is the assigned amplitude value for the peak or trough in question, $a_2$ is the actual amplitude value for the data sample nearest to the peak or trough in question, and $a_1$ and $a_3$ are, respectively, the actual amplitude values for the data samples immediately before and immediately after the data sample nearest to the peak or trough in question.

7. The method of claim 1, wherein said step of enhancing the amplitude values of said peaks and troughs further comprises the steps of:

specifying minimum enhanced amplitude values for said peaks and troughs;

identifying all of said peaks and troughs having amplitude values less than said specified minimum enhanced amplitude values; and increasing the amplitudes of said identified peaks and troughs to equal said specified minimum enhanced amplitude values.

8. A method for creating a curvature section for a portion of the earth below a specified seismic line, said method comprising the steps of:

obtaining a reflection seismic section for said portion of the earth, said reflection seismic section consisting of common-midpoint stacked seismic data traces for a plurality of laterally spaced-apart locations along said seismic line;

transforming each of said common-midpoint stacked seismic data traces to a zero-phase stacked seismic data trace;

converting each of said zero-phase stacked seismic data traces to a curvature trace; and forming a curvature section using said curvature traces.

9. The method of claim 8, wherein said step of converting each of said zero-phase stacked seismic data traces to a curvature trace further comprises the steps of:

calculating the negative second difference at each sample point along said zero-phase stacked seismic data trace according to the following equation:

$\Delta^2 = -(a_1 + a_3 - 2a_2)$ where $a_2$ is the amplitude value at the sample point in question, $a_1$ and $a_3$ are the amplitude values at the sample points immediately before and immediately after the sample point in question, and $-\Delta^2$ is the negative second difference at sample point $a_2$; and plotting said negative second difference with respect to time.

10. The method of claim 8, wherein said step of converting each of said zero-phase stacked seismic data traces to a curvature trace further comprises the steps of:

interpolating each of said zero-phase stacked seismic data traces to obtain a continuous data trace defined at every time point; and computing the second derivative with respect to time of said continuous data trace to obtain a curvature trace.

11. The method of claim 8, wherein said step of converting each of said zero-phase stacked seismic data traces to a curvature trace further comprises the steps of:

transforming each of said zero-phase stacked seismic data traces from the time domain to the frequency domain to obtain an amplitude spectrum for said zero-phase stacked seismic data trace;

multiplying each point on said amplitude spectrum by the associated frequency squared ($\omega^2$); and inverse transforming the result back to the time domain to obtain a curvature trace.

12. The method of claim 1, wherein said step of enhancing the amplitude values of said peaks and troughs further comprises the steps of:

interpolating said zero-phase seismic data trace to obtain a continuous data trace defined at every time point; and computing the second derivative with respect to time of said continuous data trace.

13. The method of claim 1, wherein said step of enhancing the amplitude values of said peaks and troughs further comprises the steps of:

transforming said zero-phase stacked seismic data trace from the time domain to the frequency domain to obtain an amplitude spectrum for said zero-phase stacked seismic data trace;

multiplying each point on said amplitude spectrum by the associated frequency squared ($\omega^2$); and inverse transforming the result back to the time domain.

* * * * *